(12) United States Patent
Keicher et al.

(10) Patent No.: US 7,879,394 B1
(45) Date of Patent: Feb. 1, 2011

(54) DEEP DEPOSITION HEAD

(75) Inventors: David M. Keicher, Albuquerque, NM (US); Lucas B. Brewer, Albuquerque, NM (US); Richard John Grylls, Albuquerque, NM (US)

(73) Assignee: Optomec, Inc., Albuquerque, NM (US)

( * ) Notice: Subject to any disclaimer, the term of this patent is extended or adjusted under 35 U.S.C. 154(b) by 612 days.

(21) Appl. No.: 11/757,139

(22) Filed: Jun. 1, 2007

Related U.S. Application Data

(60) Provisional application No. 60/810,818, filed on Jun. 2, 2006.

(51) Int. Cl.
  B05D 7/22 (2006.01)
  B05D 3/06 (2006.01)
  B05C 19/00 (2006.01)
  B05C 11/00 (2006.01)

(52) U.S. Cl. .................. 427/236; 427/554; 427/427.1; 427/180; 427/427.3; 118/308; 118/641; 118/306; 118/317; 118/323

(58) Field of Classification Search ................ 118/308, 118/309, 641–643, 58, 306, 317, 321, 323, 118/DIG. 10; 219/121.6, 121.61, 121.63, 219/121.65; 427/554, 226, 372.2, 596, 230, 427/236, 180, 427.1, 427.3
See application file for complete search history.

(56) References Cited

U.S. PATENT DOCUMENTS

| | | | |
|---|---|---|---|
| 4,200,669 A | * | 4/1980 | Schaefer et al. ............. 427/596 |
| 4,235,563 A | | 11/1980 | Hine et al. |
| 4,323,756 A | | 4/1982 | Brown et al. |
| 4,694,136 A | | 9/1987 | Kasner et al. |
| 4,724,299 A | | 2/1988 | Hammeke |
| 4,927,992 A | | 5/1990 | Whitlow et al. |
| 4,947,463 A | | 8/1990 | Matsuda et al. |
| 5,038,014 A | | 8/1991 | Pratt et al. |
| 5,043,548 A | | 8/1991 | Whitney et al. |
| 5,126,102 A | | 6/1992 | Takahashi et al. |
| 5,173,220 A | | 12/1992 | Reiff et al. |
| 5,176,328 A | | 1/1993 | Alexander |
| 5,208,431 A | | 5/1993 | Uchiyama et al. |

(Continued)

FOREIGN PATENT DOCUMENTS

CA 2131248 3/1996

(Continued)

OTHER PUBLICATIONS

Dolenc, A. et al., "An Overview of Rapid Prototyping Technologies in Manufacturing", http://swhite.me.washington.edu/~ganter/me480/rp.pdf Jul. 24, 1994, 1-23.

(Continued)

Primary Examiner—Yewebdar T Tadesse
(74) Attorney, Agent, or Firm—Philip D. Askenazy; Peacock Myers, P.C.

(57) ABSTRACT

Method and apparatus for depositing material in hard to reach locations of a workpiece. An elongated member is inserted in an opening. The member transports a laser beam from a fiber laser and material, preferably in powder form, to the desired location. The material is deposited on the workpiece and the laser beam contacts the material. The method and apparatus may be used to manufacture a part or to repair an existing part.

25 Claims, 7 Drawing Sheets

U.S. PATENT DOCUMENTS

| | | | |
|---|---|---|---|
| 5,306,447 A | 4/1994 | Marcus et al. | |
| 5,359,172 A | 10/1994 | Kozak et al. | |
| 5,393,613 A | 2/1995 | MacKay | |
| 5,398,193 A | 3/1995 | deAngelis | |
| 5,405,660 A | 4/1995 | Psiuk et al. | |
| 5,418,350 A | 5/1995 | Freneaux et al. | |
| 5,477,026 A | 12/1995 | Buongiorno | |
| 5,491,317 A | 2/1996 | Pirl | |
| 5,518,680 A | 5/1996 | Cima et al. | |
| 5,578,227 A | 11/1996 | Rabinovich | |
| 5,648,127 A | 7/1997 | Turchan et al. | |
| 5,653,925 A | 8/1997 | Batchelder | |
| 5,697,046 A | 12/1997 | Conley | |
| 5,705,117 A | 1/1998 | O'Connor et al. | |
| 5,707,715 A | 1/1998 | deRochemont et al. | |
| 5,746,844 A | 5/1998 | Sterett et al. | |
| 5,775,402 A | 7/1998 | Sachs et al. | |
| 5,779,833 A | 7/1998 | Cawley et al. | |
| 5,795,388 A | 8/1998 | Oudard | |
| 5,837,960 A | 11/1998 | Lewis et al. | |
| 5,847,357 A | 12/1998 | Woodmansee et al. | |
| 5,849,238 A | 12/1998 | Schmidt et al. | |
| 5,993,554 A | 11/1999 | Keicher et al. | |
| 6,046,426 A | 4/2000 | Jeantette et al. | |
| 6,144,008 A | 11/2000 | Rabinovich | |
| 6,176,647 B1 | 1/2001 | Itoh | |
| 6,251,488 B1 | 6/2001 | Miller et al. | |
| 6,268,584 B1 | 7/2001 | Keicher et al. | |
| 6,328,026 B1 | 12/2001 | Wang et al. | |
| 6,384,365 B1 | 5/2002 | Seth et al. | |
| 6,391,251 B1 | 5/2002 | Keicher et al. | |
| 6,405,095 B1 | 6/2002 | Jang et al. | |
| 6,410,105 B1 | 6/2002 | Mazumder et al. | |
| 6,486,432 B1 | 11/2002 | Colby et al. | |
| 6,520,996 B1 | 2/2003 | Manasas et al. | |
| 6,608,281 B2 * | 8/2003 | Ishide et al. | 219/121.78 |
| 6,656,409 B1 | 12/2003 | Keicher et al. | |
| 6,774,338 B2 | 8/2004 | Baker et al. | |
| 6,811,744 B2 | 11/2004 | Keicher et al. | |
| 6,998,785 B1 | 2/2006 | Silfvast et al. | |
| 7,009,137 B2 | 3/2006 | Guo et al. | |
| 7,674,671 B2 | 3/2010 | Renn et al. | |
| 2002/0082741 A1 | 6/2002 | Mazumder et al. | |
| 2002/0128714 A1 | 9/2002 | Manasas et al. | |
| 2005/0002818 A1 | 1/2005 | Ichikawa | |
| 2005/0133527 A1 | 6/2005 | Dullea et al. | |
| 2005/0247681 A1 * | 11/2005 | Boillot et al. | 219/121.63 |
| 2006/0057014 A1 | 3/2006 | Oda et al. | |
| 2006/0172073 A1 | 8/2006 | Groza et al. | |
| 2007/0154634 A1 | 7/2007 | Renn | |

FOREIGN PATENT DOCUMENTS

| | | |
|---|---|---|
| DE | 03541999 A | 6/1987 |
| EP | 0 555 896 A2 | 8/1993 |
| EP | 0 950 502 A2 | 10/1999 |
| WO | WO 92/18323 | 10/1992 |
| WO | WO 97/16274 | 5/1997 |

OTHER PUBLICATIONS

Grylls, Richard J. et al., "Biomimetic Hybrid Implants by Laser Deposition", *National Medical Technology Testbed Application* May 14, 2001, 1, 8-18.

Ingber, Donald E. et al., "Method, Apparatus, Design and Manufacture of Devices for Tissue Repair, Transplantation and Surgical Reconstruction", *Provisional application filed in U.S. Patent and Trademark Office* Jun. 4, 1999.

Keicher, D. M. et al., "The Laser Forming of Metallic Components Using Particulate Materials", *JOM* 1997, 51-54.

Mazumder, J. et al., "The Direct Metal Deposition of H13 Tool Steel for 3-D Components", *JOM* May 1997, 55-60.

Nakai, Takashi et al., "Fabrication of Three-Dimensional Objects Using Laser Lithography", *Systems and Computers in Japan* vol. 20, No. 3 1989, 68-67.

Pease, III, Leander F. et al., "Rapid Prototyping of P/M Parts and Tooling", *Innovative & Emerging Technologies Seminar* Dec. 3, 1998, 2, 5, 15-16.

Sammarco, Carmine et al., "Metals Having Improved Microstructure and Method of Making", *U.S. Provisional Patent Application filed in U.S. Patent Office* May 15, 2001.

Smugeresky, J. E. et al., "Laser Engineered Net Shaping (LENS TM) Process: Optimization of Surface Finish and Microstructural Properties", Jun. 30, 1997, 1-11.

Smugeresky, J. E. et al., "Using the Laser Engineered Net Shaping (LENS TM) Process to Produce Complex Components from a CAD Solid Model", *Proceedings of the SPIE-The International Society for Optical Engineering, Lasers as Tools for Manufacturing, II* Feb. 12-17, 1997, 3-9.

Vanheusden, K. et al., "Direct Printing of Interconnect Materials for Organic Electronics", *IMAPS ATW, Printing an Intelligent Future* Mar. 8-10, 2002, 1-5.

* cited by examiner

US 7,879,394 B1

DEEP DEPOSITION HEAD

CROSS-REFERENCE TO RELATED APPLICATIONS

This application claims the benefit of the filing of U.S. Provisional Patent Application Ser. No. 60/810,818, entitled "Deep Repair Deposition Head," filed on Jun. 2, 2006, and the specification thereof is incorporated herein by reference.

BACKGROUND OF THE INVENTION

Field of the Invention (Technical Field)

The present invention is a method and apparatus for manufacturing or repairing components by depositing material in hard to reach areas of the components.

BRIEF SUMMARY OF THE INVENTION

The present invention is an apparatus for depositing material on a workpiece, the apparatus comprising an elongated member comprising a deposition head at one end of the member; a fiber laser for producing a laser beam, wherein the path of the laser beam is internal to the member; at least one material delivery tube attached to or within the member and terminating in a feed nozzle proximate to or within the deposition head; a mirror proximate to or within the deposition head for reflecting the laser beam from the fiber laser out of the deposition head; wherein the reflection angle of the laser beam relative to an axis of the elongated member is greater than 90 degrees; and wherein material exiting the nozzle is contacted by the laser beam approximately at a desired location on the workpiece. The member preferably comprises an aspect ratio of greater than approximately 3:1. The apparatus preferably further comprises one or more jointed extension members, wherein each joint preferably comprises a mirror for reflecting or focusing the laser beam.

The deposition head is preferably rotatable or translatable with respect to the workpiece. The deposition head is optionally manually movable. The deposition head and elongated member preferably fit inside an opening in the workpiece of approximately 6 inches, or more preferably approximately 2 inches, or most preferably approximately 0.5 inches. The workpiece is preferably conductive. The apparatus preferably comprises a conductive element which is grounded when it contacts the workpiece. The material preferably comprises a powder.

The present invention is also a method for depositing material on a workpiece, the method comprising the steps of providing an elongated member comprising a deposition head on one end of the member; inserting the deposition head into a high aspect ratio cavity of the workpiece; transporting a material to the deposition head; ejecting the material from the deposition head and depositing the material at approximately a desired location of the workpiece; transmitting a laser beam from a fiber laser through the elongated member; reflecting the laser beam out of the deposition head at an angle relative to an axis of the elongated member of greater than 90 degrees; and contacting the ejected material with the laser beam at approximately the desired location. The method preferably further comprises the step of moving the deposition head with respect to the workpiece. The moving step is optionally performed manually, or preferably performed in accordance with a computer aided design file. The method preferably further comprises the step of cooling the deposition head. The method also preferably further comprises the step of focusing the laser beam to a size of less than approximately 5 mm at the workpiece, or more preferably less than approximately 1 mm at the workpiece, or most preferably approximately 0.1 mm at the workpiece. The minimum feature size of the deposited material is preferably approximately 200 microns. The method preferably further comprises the steps of providing a conductive element and contacting the conductive element to the workpiece in order to determine the standoff distance. The method preferably comprises either repairing or manufacturing the workpiece.

An object of the present invention is to enable repair of components, particularly in high value industries such as aerospace and defense.

Another object of the present invention is to enable manufacturing of parts or components comprising complex three dimensional shapes by depositing material in otherwise inaccessible locations.

An advantage of the present invention is that it may be used to repair areas of components which are hard to access due to the complex shape of the component.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The LENS™ process is a direct material deposition method used to manufacture and repair parts. The process is described in more detail in, for example, U.S. Pat. Nos. 6,391,251, 6,811,744, and 6,046,426, the specifications and claims of which are incorporated herein by reference. The present invention is for manufacture or repair of components in areas which are hard to access due to the complex shape of the component. Such areas are typically situated in a high aspect ratio cavity, which, as used throughout the specification and claims, means a cavity which is substantially deeper than it's opening is wide. A typical high aspect ratio cavity has an aspect ratio of depth to opening size of greater than approximately 3:1. In this type of situation, where there is typically not a direct line-of-sight path to the desired area, it is not possible to get a traditional LENS™ or other materials deposition head into position to deposit material. Manufacturing or repair is performed by providing material, preferably in powder form, to the desired location and processing the powder with a laser beam in order to form a solid deposit.

The present invention preferably utilizes a laser with high beam quality to manufacture or make repairs deep in areas where access is limited, for example down holes or shafts, or other cavities that have a high aspect ratio. A high laser beam quality allows the focusing optics to be distant from the deposition area. To deposit on the side of a tube, plate, or the like, a turning optic is preferably inserted in the hole or cavity, and the laser beam applied to this optic. Since the optic is preferably close to the meltpool for geometric reasons, the laser intensity incident on it is high, so the optic may comprise a crystal rather than a mirror. The powder to be deposited for repair will typically be carried to the repair area by a tube or the like. The deposition head may be able to rotate from a fixed position to make a line build, in addition to translating as is normally performed, since the high beam quality laser typically has a large working depth.

Deposition is successfully accomplished when the head and part are moved relative to one another. Typically the head remains stationary while the part rotates or is otherwise moved relative to the head. However, the part can remain stationary while the head moves, or both the head and the part may move.

Figure 1:
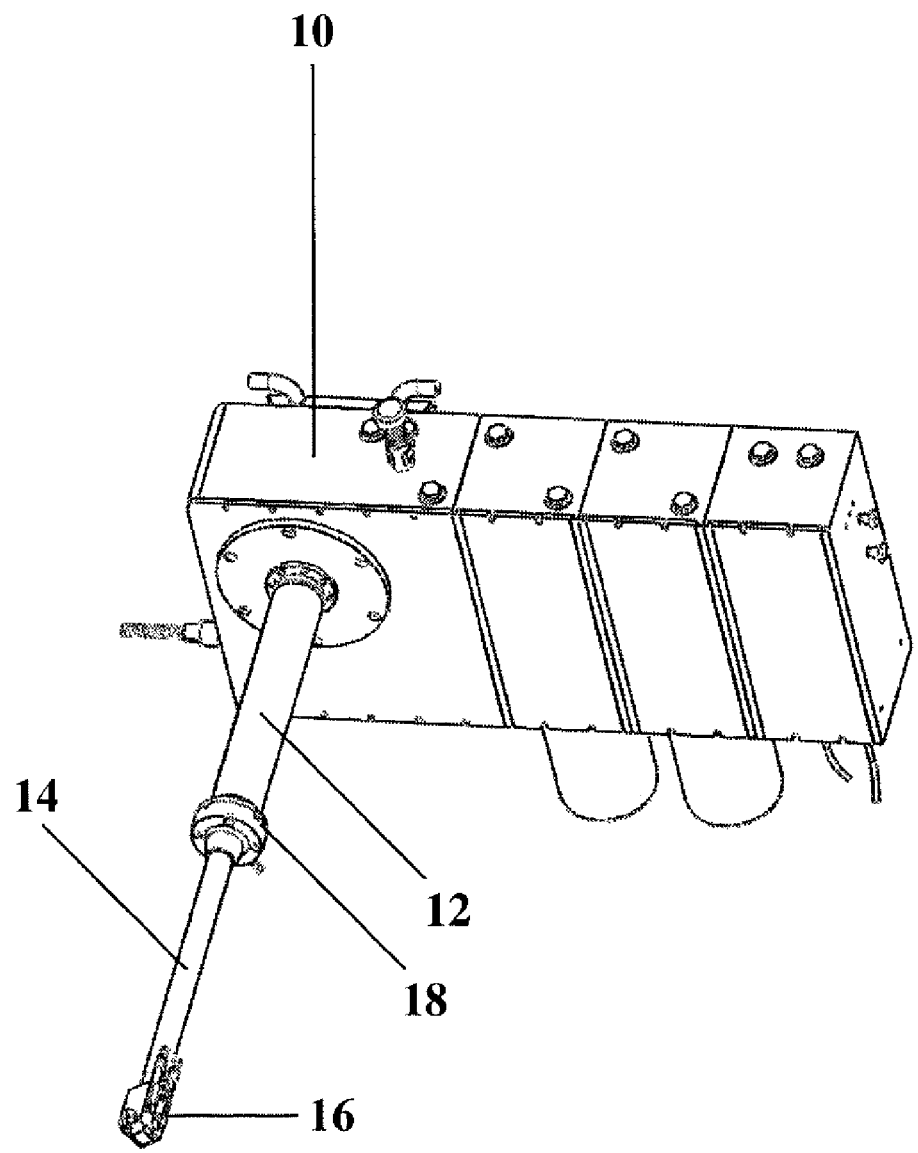
FIG. 1 is a schematic of an embodiment of the apparatus of the present invention in a vertical configuration.
Figure 2:
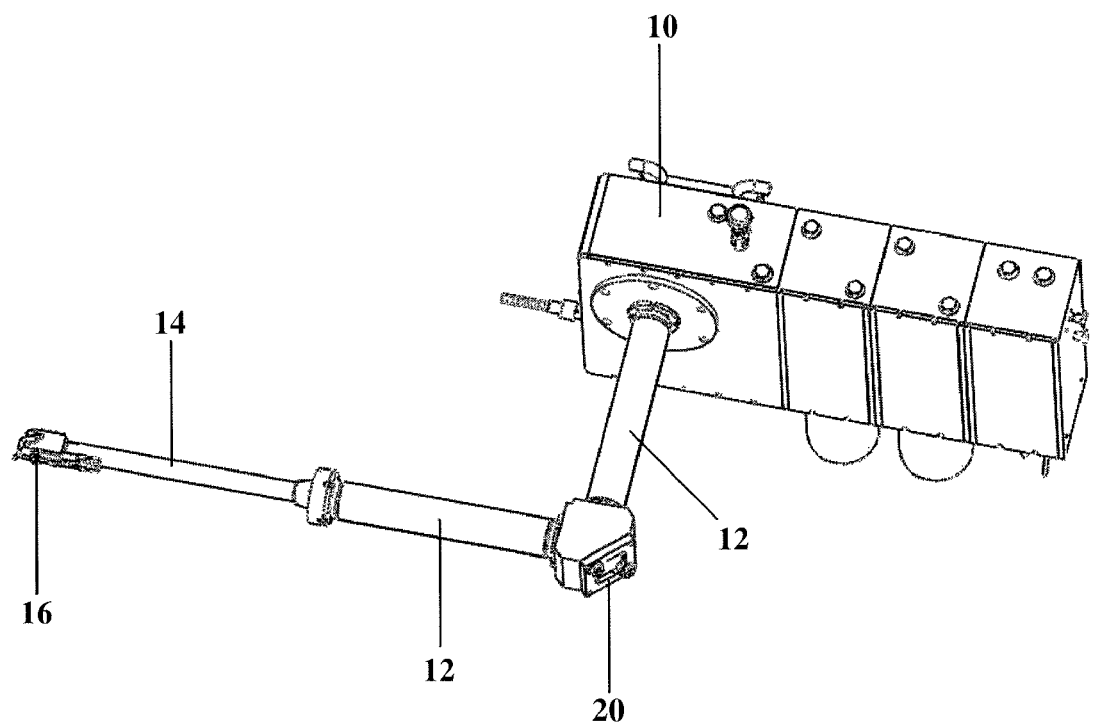
FIG. 2 is a schematic of an embodiment of the apparatus of the present invention in a horizontal configuration.

FIG. 1 shows deposition head 16 with head tube 14 attached to optional extension tube 12, via union 18, which attaches to optics housing 10. Head tube 14 preferably comprises an internal diameter of approximately 1 cm, and an approximate length of 30 cm. The length of extension tube 12 can vary depending on the application. FIG. 2 shows head tube 14 attached to optional extension tube 12, which is attached to elbow 20. These various tubes preferably comprise a very stiff material, since they will typically be cantilevered out a long way.

Figure 3:
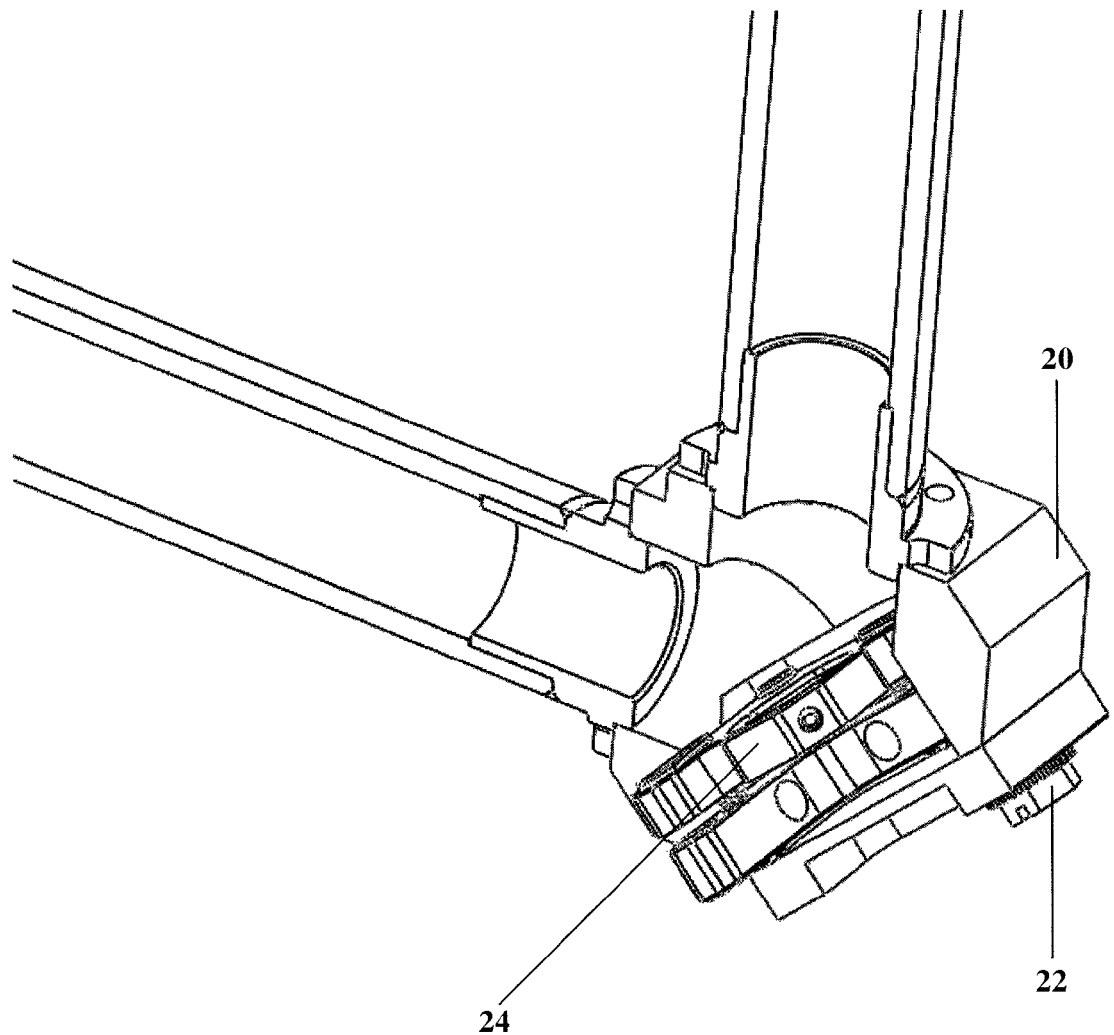
FIG. 3 is a schematic of the elbow and turning mirror assembly.

FIG. 3 shows the elbow and turning mirror assembly. The elbow's bolt pattern will accept extension tube 12 or head tube 14 and is preferably clocked at four positions. Turning mirror 24 preferably comprises a YH YAG/HeNe mirror, which both reflects the laser beam and also reflects an image from the deposition area back to a camera, preferably in optics housing 10. Turning mirror 24 is preferably adjustable via external mirror adjustment 22.

Figure 4:
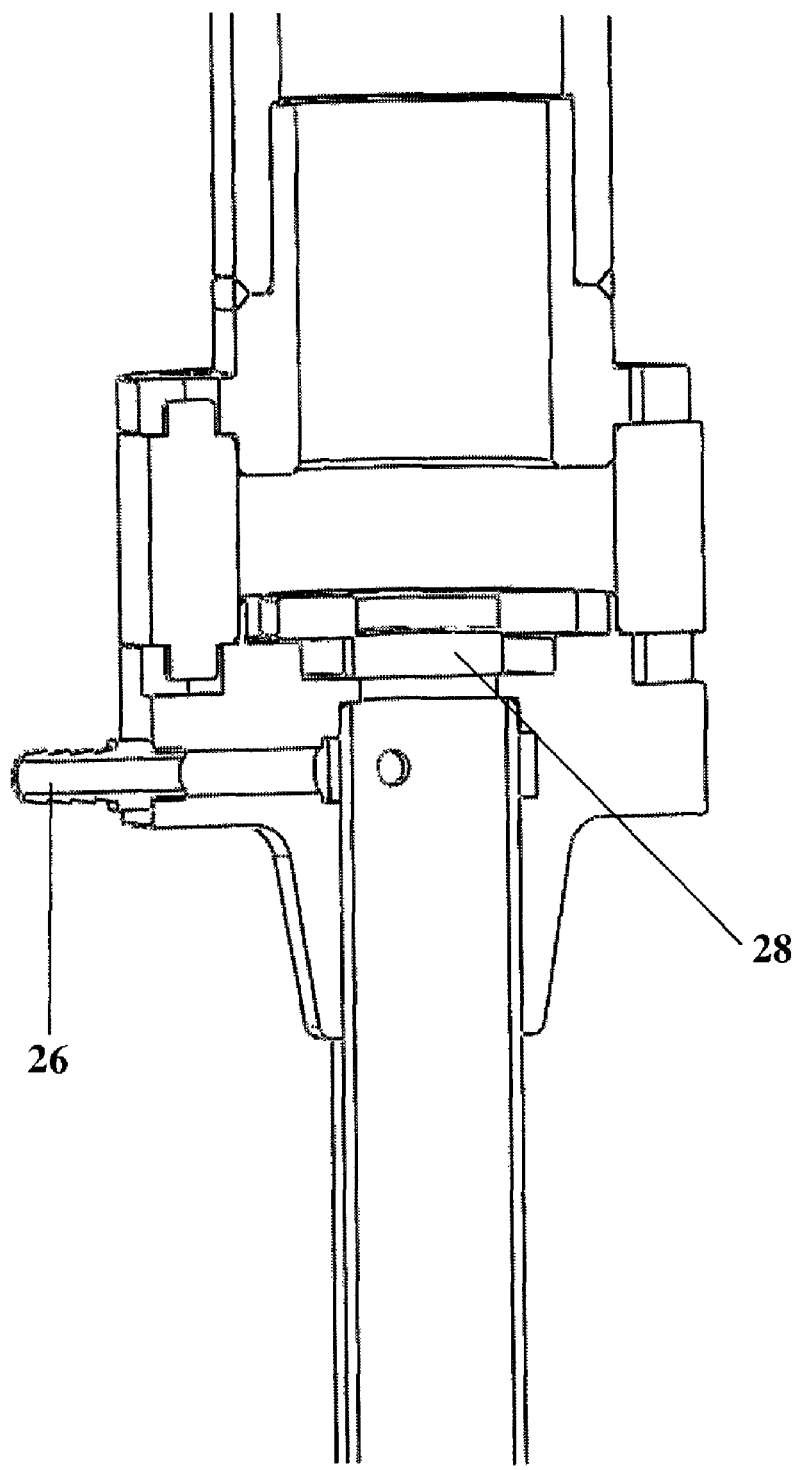
FIG. 4 is a schematic showing the head tube and focusing lens.

FIG. 4 shows the head tube and focusing lens. The head tube's bolt pattern preferably accepts elbow 20, extension tube 12, or optics housing 10. Center purge gas net 26 is preferably used to protect focusing lens 28 and turning mirror 24. Focusing lens 28 is preferably located at the upper end of head tube 14, since use of a fiber laser having near diffraction limited beam quality enables the use of a large standoff distance while still retaining a relatively small focused beam spot at the deposition surface. The beam can then be directed to a desired location using, for example, one or more final steering mirrors.

Figure 5:
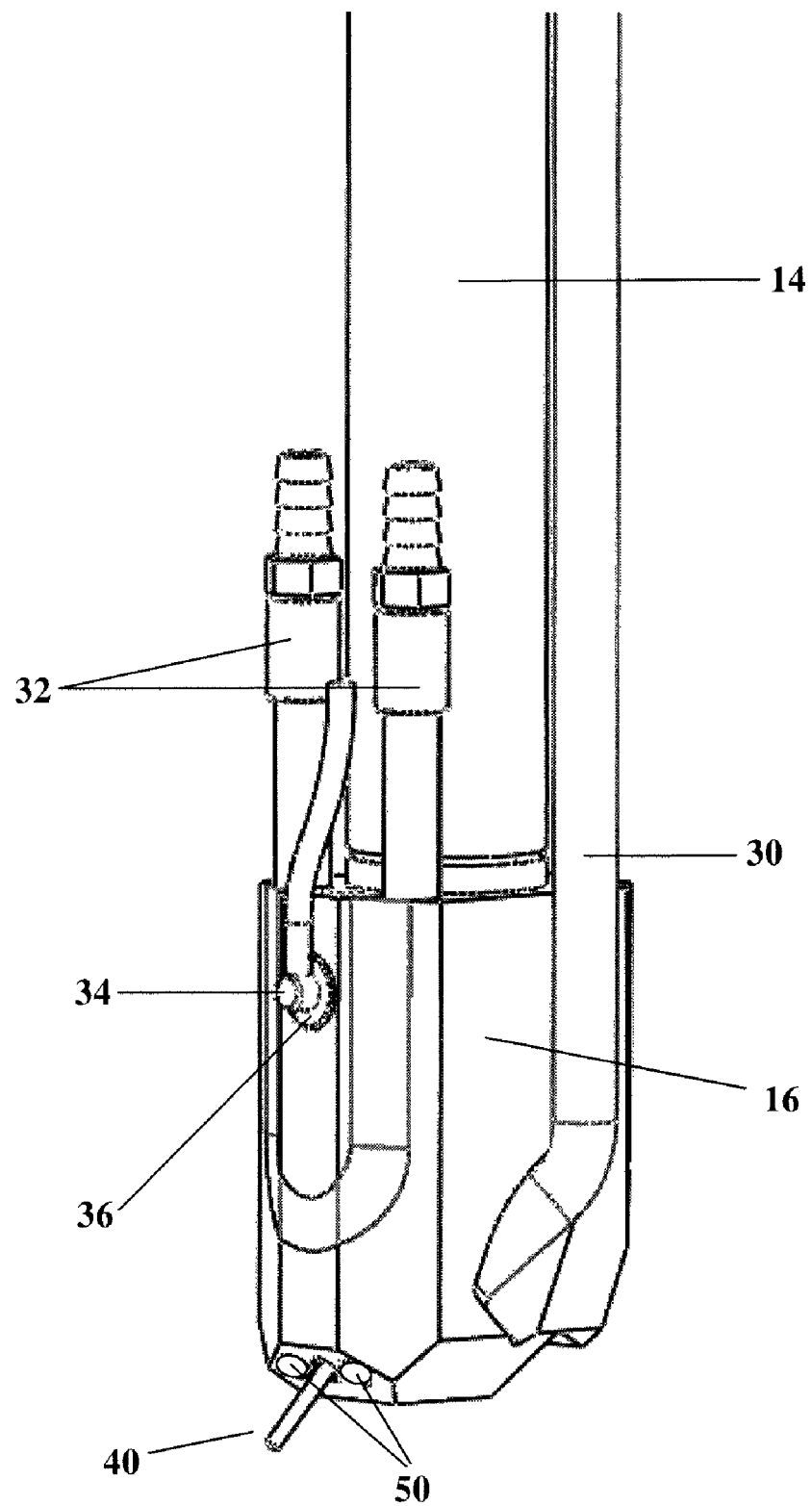
FIG. 5 is a perspective view of the deposition head.

As shown in FIG. 5, water cooling lines 32 are preferably used to protect deposition head 16 from the heat generated by the deposition process. Water cooling lines 32 are preferably secured with heat resistant epoxy or the like. One or more powder feed tubes 30 preferably comprise a heat resistant material, for example Viton. Powder feed tubes 30 preferably make a gentle bend into deposition head 16 to avoid disrupting the powder flow. Powder feed nozzles 50 preferably comprise copper and are preferably flush to the surface of deposition head 16, which as stated above is preferably water cooled. These three features preferably reduce the risk of material build up around powder feed nozzles 50. Powder feed nozzles 50 are preferably approximately 45 degrees apart.

To optimize powder utilization the standoff distance between deposition head 16 and the substrate or article being manufactured or repaired is preferably located within approximately 0.020" of the powder to laser convergence. The standoff distance, i.e. the approximate location where the materials flow from powder feed nozzles 50 converge with the focal point of laser beam 40, for an example embodiment of the present invention is approximately 0.375" from powder feed nozzles 50. Standoff setting tool 34 preferably comprises a copper pin that is attached to deposition head 16 via ceramic insulator 36. A power supply preferably supplies a low current signal to standoff setting tool 34. When the pin contacts a conductive surface attached to a ground, such as the work surface, the signal is grounded and the operator is notified via the user interface. The operator then preferably moves the head away from the conductive surface by a fixed amount, preferably approximately 0.050", to set the correct standoff distance.

Figure 6:
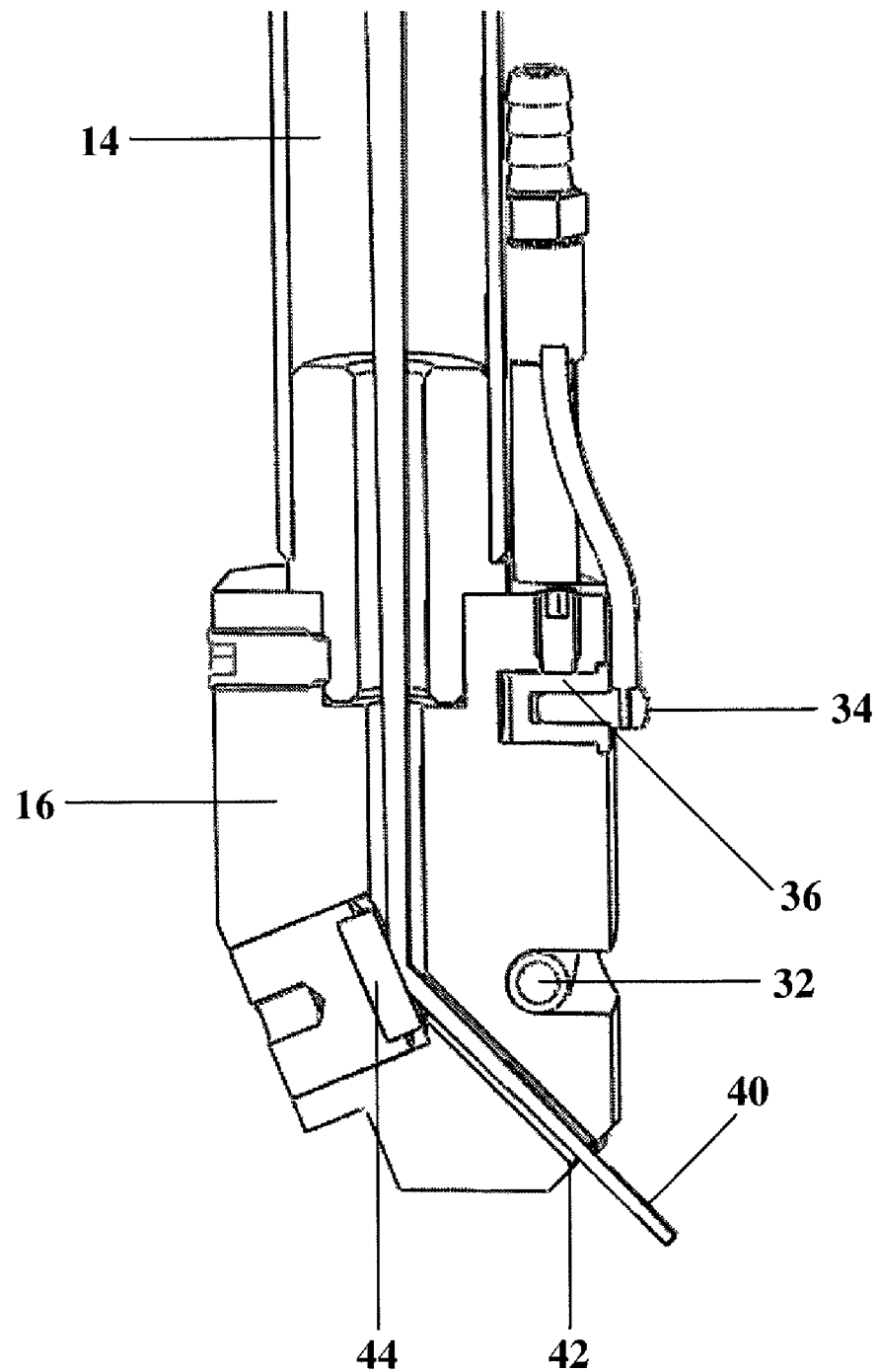
FIG. 6 is cross-section schematic of the deposition head.

Depicted in FIG. 6, final turning mirror 44 preferably comprises coated fuse-silica. The coating and mirror angle enable the beam to reflect at greater than 90 degrees, preferably approximately 135 degrees, relative to the incoming beam, although any angle, including less than or equal to 90 degrees, may be used. When deposition head 16 is positioned parallel or perpendicular to the work surface, the incident beam is therefore at preferably approximately 45 degrees to the work surface, increasing versatility. Purge gas preferably exits deposition head 16 via center purge outlet 42.

By using different mirrors at different angles, or comprising different coatings, the angle at which the laser beam exits the head may be varied. With this arrangement, a new deposition head would be required for each required angle. Alternatively, a LaserWrist arrangement could be constructed at the deposition head to allow the deposition angle to be continuously varied.

Using a standard laser, such as a Nd:YAG laser, it is typically impossible to obtain a small spot size at the deposition head, because the beam quality is not sufficiently good. Thus the present invention preferably utilizes a fiber laser. These lasers have high beam quality through use of a small fiber, which enables this configuration to focus the beam to smaller than approximately 5 mm, and more preferably smaller than approximately 1 mm at the workpiece, which is useful for the present invention. The near diffraction limited beam quality of the fiber laser enables the use of a small diameter beam to reach into very small openings. The actual beam width is typically dependent on the aspect ratio of the deposition head and/or the head tube. In an example embodiment, with a 10 micron output fiber, and a 10:1 aspect ratio, the spot size is approximately 100 microns. A typical minimum LENS bead size is 2×-3× the beam spot size, so the minimum feature size for this example is approximately 200 to 300 microns.

The fiber laser also enables the device to be used manually. Since the present invention preferably utilizes a high quality laser beam, the working depth can be large, which means that a human hand could guide it, rather than requiring robotic assistance. Combined with an eye-safe laser, this may be a safe and efficient way to make other types of repairs, instead of, for example, TIG welding or another welding process.

Figure 7:
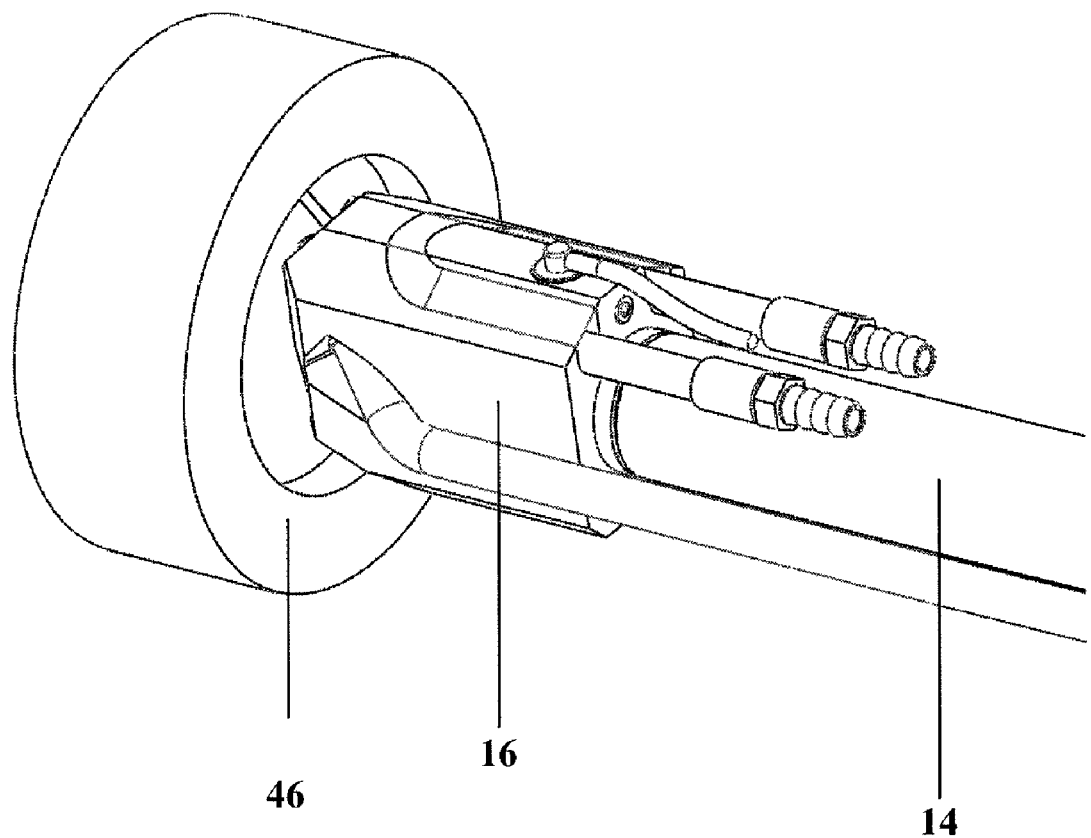
FIG. 7 is a schematic showing the head tube in an opening.

FIG. 7 shows opening 46 that can be accessed by an example embodiment of the present invention. The minimum inner diameter of opening 46 for an example embodiment of the present invention is approximately 1.675 inches; however, the present invention may be adapted to fit in an opening of less than approximately 6 inches, or less than approximately 2 inches, or approximately 0.5 inches.

Applications

The present invention is useful in a variety of applications.
ID Repair
Depositing in confined spaces
Seal repair
Airfoil repair
Repair components of an assembly without having to disassemble
In-situ repair, without having to disassemble
Repair of corners of a sealed tube, optionally performed by depositing material as the tube is rotated with the deposition head remaining stationary
Manufacture or repair of the bottom of a sealed tube, optionally performed by rotating the tube and moving the deposition head parallel to the tube bottom
Manufacture or repair of the ID of a tube, preferably by rotating the tube and moving the deposition head parallel to the inner tube surface
Manufacture of complex geometries
Addition of physical features to in-process or existing components Although the invention has been described in detail with particular reference to these preferred embodiments, other embodiments can achieve the same results. Variations and modifications of the present invention will be obvious to those skilled in the an and it is intended to cover in the appended claims all such modifications and equivalents. The entire disclosures of all references, applications, patents, and publications cited above are hereby incorporated by reference.

What is claimed is:

1. An apparatus for depositing material on a workpiece, the apparatus comprising:
    an elongated member comprising a deposition head at one end;
    a fiber laser for producing a single laser beam, wherein a path of said single laser beam is internal to said elongated member;
    at least one material delivery tube attached to or within said elongated member and terminating in a feed nozzle proximate to or within said deposition head; said feed nozzle diverging away from an elongate axis of said elongated member;
    a mirror proximate to or within said deposition head for reflecting said single laser beam from said fiber laser out of said deposition head so that said single laser beam diverges from said elongate axis of said elongated member;
    wherein a reflection angle of said single laser beam relative to said elongate axis of said elongated member is greater than 90 degrees; and
    wherein material exiting said feed nozzle is contacted by said single laser beam approximately at a desired location on the workpiece.

2. The apparatus of claim 1 wherein said elongated member comprises an aspect ratio of greater than approximately 3:1.

3. The apparatus of claim 1 further comprising one or more jointed extension members.

4. The apparatus of claim 3 wherein each joint comprises a mirror for reflecting or focusing said single laser beam.

5. The apparatus of claim 1 wherein said deposition head is rotatable or translatable with respect to the workpiece.

6. The apparatus of claim 1 wherein said deposition head is manually movable.

7. The apparatus of claim 1 wherein said deposition head and elongated member fit inside an opening in the workpiece of approximately 6 inches.

8. The apparatus of claim 7 wherein said deposition head and elongated member fit inside an opening in the workpiece of approximately 2 inches.

9. The apparatus of claim 8 wherein said deposition head and elongated member fit inside an opening in the workpiece of approximately 0.5 inches.

10. The apparatus of claim 1 wherein said workpiece is conductive.

11. The apparatus of claim 10 further comprising a conductive element which is grounded when it contacts said workpiece.

12. The apparatus of claim 1 wherein said material comprises a powder.

13. A method for depositing material on a workpiece, the method comprising the steps of:
    providing an elongated member comprising a deposition head on one end;
    inserting the deposition head into a high aspect ratio cavity of the workpiece;
    transporting a material to the deposition head via at least one material delivery tube attached to or within the elongated member and terminating in a feed nozzle proximate to or within the deposition head; the feed nozzle diverging away from an elongate axis of the elongated member;
    ejecting the material from the feed nozzle and depositing the material at approximately a desired location of the workpiece;
    transmitting a single laser beam from a fiber laser, the fiber laser disposed internally to the elongated member;
    reflecting the single laser beam from a mirror proximate to or within the deposition head out of the deposition head at an angle relative to the elongate axis of the elongated member of greater than 90 degrees, so that the single laser beam diverges from the elongate axis of the elongated member; and
    contacting the ejected material with the single laser beam at approximately the desired location.

14. The method of claim 13 further comprising the step of moving the deposition head with respect to the workpiece.

15. The method of claim 14 wherein the moving step is performed manually.

16. The method of claim 14 wherein the moving step is performed in accordance with a computer aided design file.

17. The method of claim 13 further comprising the step of cooling the deposition head.

18. The method of claim 13 further comprising the step of focusing the single laser beam to a size of less than approximately 5 mm at the workpiece.

19. The method of claim 18 further comprising the step of focusing the single laser beam to a size of less than approximately 1 mm at the workpiece.

20. The method of claim 19 further comprising the step of focusing the single laser beam to a size of approximately 0.1 mm at the workpiece.

21. The method of claim 13 wherein a minimum feature size of the deposited material is approximately 200 microns.

22. The method of claim 13 further comprising the step of providing a conductive element.

23. The method of claim 22 comprising the step of contacting the conductive element to the workpiece.

24. The method of claim 23 further comprising the step of determining a standoff distance between the deposition head and the workpiece.

25. The method of claim 13 comprising repairing or manufacturing the workpiece.

* * * * *